March 1, 1938.  N. ARCHER  2,109,985
FLUID TIGHT SEAL BETWEEN MACHINE MEMBERS
Filed Feb. 26, 1936
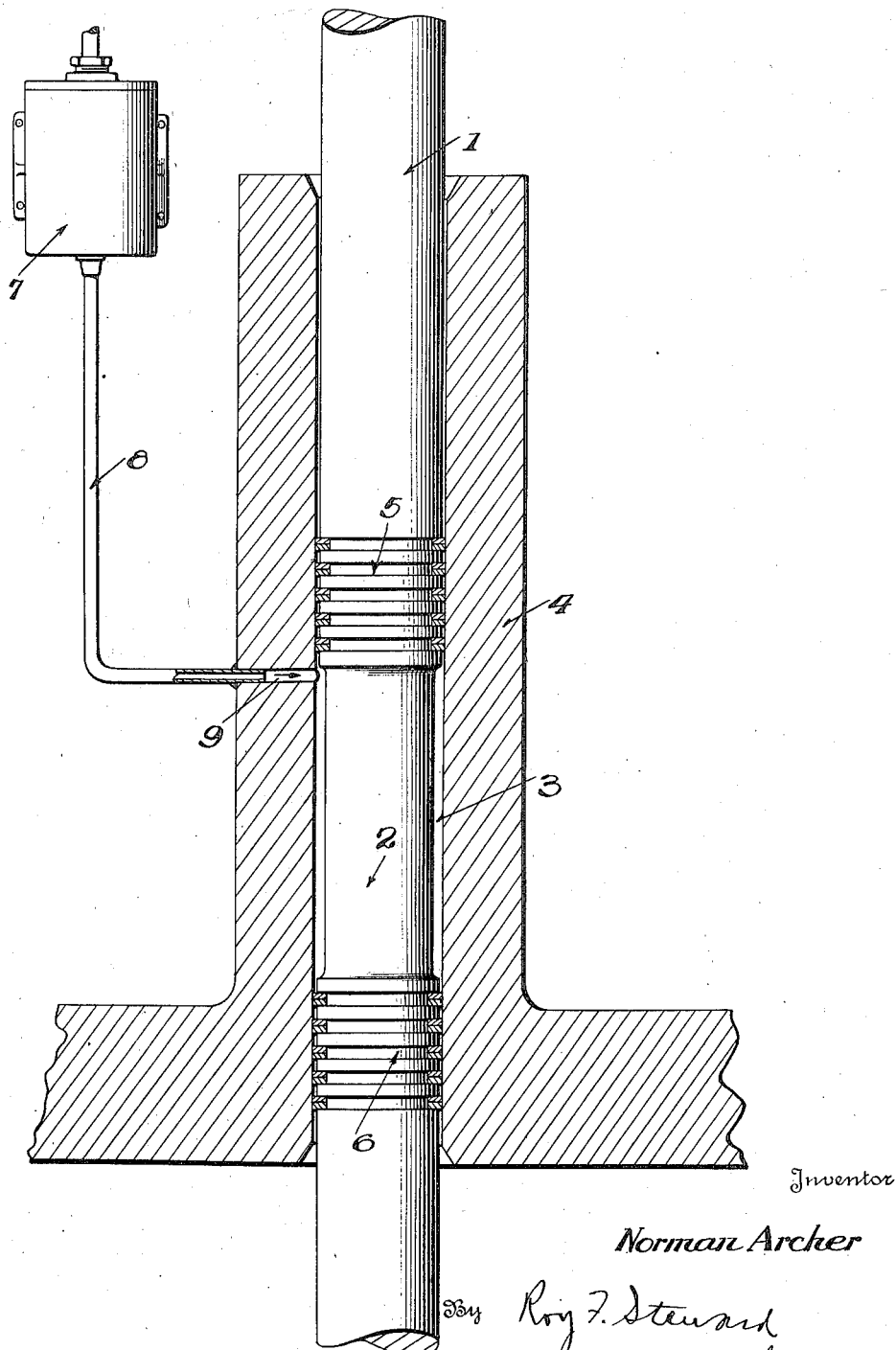
Inventor
Norman Archer
By Roy F. Steward
his Attorney Patented Mar. 1, 1938

2,109,985

UNITED STATES PATENT OFFICE 2,109,985

FLUID TIGHT SEAL BETWEEN MACHINE MEMBERS

Norman Archer, Norton-on-Tees, England, assignor to Imperial Chemical Industries Limited, a corporation of Great Britain Application February 26, 1936, Serial No. 65,894
In Great Britain February 28, 1935

1 Claim. (Cl. 286—27)

This invention relates to fluid-tight seals between machine members, one of which reciprocates within the other, such as piston rods and glands, pistons and cylinders, and is of particular application where the fluid pressure to be withstood by the seal is very high, for example, 200 atmospheres.

According to the present invention, a fluid tight seal is provided between relatively reciprocating members of the type described by the provision on one of the members of an annular channel at each side of which is provided one or more packing rings, a sealing liquid such as oil being supplied under pressure to the annular channel.

The rings and the annular channel may both be on the same member or the rings may be on one of the members and the channel on the other member. If desired, the rings on one side of the channel need not be on the same member as the rings on the other side. When the channel is provided on the reciprocating member its width must not be appreciably less than the stroke in order that it can be maintained continually in communication with the oil supply under pressure. It is not in general advisable to make the channel appreciably wider than the length of the stroke, since this leads to an unnecessary lengthening of the seal. When the channel is provided on the stationary member, it may be of any desired width. When the rings are carried by one member and the channel is provided in the other, the distance between the rings on opposite sides of the channel should not be less than the length of the stroke plus the width of the channel.

The pressure of the sealing liquid is maintained in the annular channel at such a value that the fluid being handled by the machine is prevented from leaking, and at the same time the flow of sealing liquid past the rings is minimized. Any suitable means such as a pump or accumulator may be employed to maintain the pressure in the annular channel. The packing rings may be of any suitable known type, but it is preferred to employ piston rings sold under the registered trade-mark "Clupet" in order to reduce the escape of sealing liquid from the annular channel. "Clupet" is the trade name used by the Clews and Petersen Engineering Company of Great Britain for a double-coil one-piece piston ring manufactured by them, which resembles an ordinary key ring in construction and which is illustrated in British Patents 141,929 and 177,863, for example.

One form of the invention is illustrated in the accompanying drawing, which is a diagrammatic sectional elevation of a piston rod working in a gland or stuffing box. In this drawing reference numeral 1 denotes a piston rod which reciprocates in a housing 4. The piston rod has a portion 2 reduced in diameter, the length of which is equal to the stroke, and an annular channel 3 is thereby formed between the piston rod and the housing. Oil is fed into the annular channel 3 from the pump 7 via the pipe line 8 and the duct 9 in the wall of the housing 4. The annular channel 3 is thereby kept full of oil under pressure, and leakage of fluid from the working cylinder through the clearance between the rod and the housing is prevented. Sets of sealing rings 5 and 6 are carried by the piston rod on either side of the annular channel, thereby minimizing the escape of oil from the annular channel. The sealing rings are of the double ring type and rectangular in cross-section in order to reduce the leakage of oil to the minimum.

I claim:

A fluid-tight seal for relatively reciprocating high-pressure machine members, such as piston rods and guides for high pressure gas circulators, comprising inner and outer members, the inner member being reduced in cross-section to form an annular channel between said members, at least two metal packing rings of rectangular cross-section carried by said inner member at each end of said annular channel, and means including a port in said outer member for supplying a sealing liquid such as oil under pressure to said annular channel, the length of said annular channel being such that it is always in communication with said port during relative reciprocation of said members.

NORMAN ARCHER.